Figure 1:
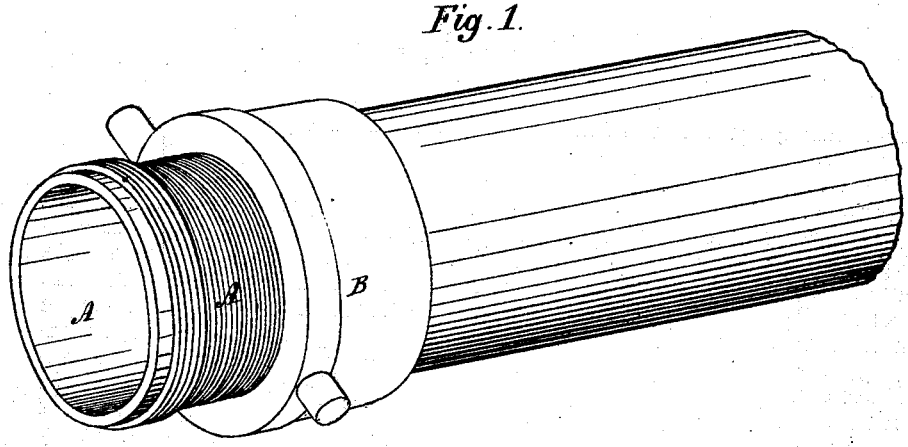

ALBERT F. ALLEN.

Hose Coupling,

No. 123,070.  Patented Jan. 30, 1872.

Witnesses
Phil. F. Larner
George F. Stenz.

Inventor.
Albert F. Allen
By Wm. C. Wood
Attorney 123,070

UNITED STATES PATENT OFFICE.

ALBERT F. ALLEN, OF PROVIDENCE, RHODE ISLAND.

IMPROVEMENT IN HOSE-COUPLINGS.

Specification forming part of Letters Patent No. 123,070, dated January 30, 1872.

*To all whom it may concern:*

Be it known that I, ALBERT F. ALLEN, of the city and county of Providence and State of Rhode Island, have invented a certain new and useful Improvement in Hose-Couplings.

My invention relates to that class of couplings which are united to the hose-ends by the combined action of interior and exterior holding-surfaces; and consists in combining with said holding-surfaces an interposed annular friction-band of thin metal in such a manner that the interior shell of the coupling, constituting the interior holding-surface, can be readily withdrawn from the hose when desired, and at the same time to permit the coupling to hold the hose sufficiently secure for all practical purposes; and I do hereby declare that the following specification, taken in connection with the drawing furnished and forming part of the same, is a clear, true, and exact description thereof.

Figure 2:
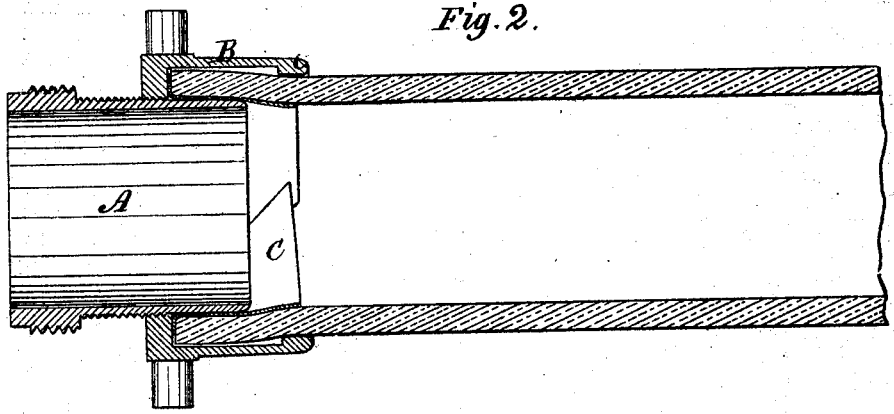
Figure 3:
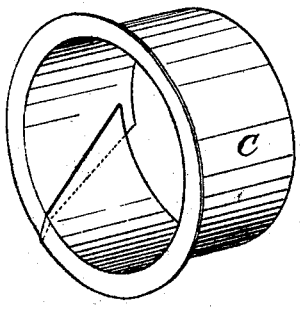

Figure 1 represents in perspective a portion of a hose-coupling embodying my improvement. Fig. 2 represents the same in longitudinal vertical section. Fig. 3 represents in perspective my annular friction-band.

A represents the main portion of one-half of a coupling. The larger end may be provided with any of the well-known appliances for connecting it with its fellow. The smaller end is provided with an exterior screw-thread, with the exception of a plain surface at or near the extreme end. The exterior diameter of this portion of the coupling is somewhat larger than the interior diameter of the hose with which it is to be used. B represents an exterior holding-band. Its larger end is provided with an interior screw-thread corresponding to and fitting the exterior thread of the main portion A. Its smaller end is provided with an annular projection, C, the parts thus described corresponding with the coupling described in Letters Patent granted to J. C. Cooke, November 30, 1858. C represents my annular friction-band. It is composed, by preference, of brass or copper rolled to proper thickness (usually very thin) and cut into proper form. It is interposed between the exterior of the main portion A of the coupling and the interior of the hose, and by its presence admits of the ready connection and subsequent separation of the parts, and the withdrawal of the hose. A comparatively desirable effect will result from the application of the friction-band between the exterior of the hose and the interior of the holding-band B. When rubber hose, for instance, and couplings of this general character are united, the screw-connections are brought well together by the application of leverage, the ends of the hose being thereby heavily compressed. After considerable use the corrosion of the metallic surfaces in contact with the hose and the changes occurring in the rubber compound cause the hose and couplings to unite in such a manner that it is almost impossible to separate them without the application of a high degree of heat and the use of heavy tools especially prepared for the purpose. It is, of course, desirable, while the hose and couplings be well united, that they should also be capable of ready separation, to admit of the remounting of the same couplings upon other sections of hose if desired. It frequently occurs, after or during the long service at any one time of a line of hose, that a break will occur in a section, necessitating its withdrawal. As hitherto united, it was a practical impossibility to disconnect the couplings from the hose on the spot and attach them to new sections or to parts of old sections shortened by cutting out the defective portions. By the use of my friction-band the power of resistance against longitudinal strain is in no way lessened, nor is the hose held less securely than if it be not employed, and at the same time there are at least two surfaces always in contact, which, however much they may corrode, cannot unite or hold so firmly that a moderate circumferential strain applied in the usual manner, with wrenches prepared for the purpose, will fail to disconnect the several parts and effect a ready detachment from the hose. By having a supply of these friction-bands on hose-carts or engines, it becomes practicable, by their use, to reconnect couplings and hose at or during a fire without sending them to shops especially prepared with tools for that purpose. The friction-bands under some circumstances may be fit for use a second time, but they are, of course, liable to be generally so mutilated in the withdrawal as to render them unfit for further use.

Having thus described my invention, I claim as new and desire to secure by Letters Patent—

The friction-band, in combination with the interior and exterior holding-surfaces of a hose-coupling, interposed between the hose and either or both of said surfaces, substantially as and for the purposes specified.

ALBERT F. ALLEN.

Witnesses:
EDWIN METCALF,
F. B. BYRAM.